(12) United States Patent
Kogure (10) Patent No.: US 7,194,813 B2
(45) Date of Patent: *Mar. 27, 2007

(54) GYROCOMPASS

(75) Inventor: Shoichi Kogure, Kanagawa (JP)

(73) Assignee: Yokogawa Electric Corporation, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 11/069,882

(22) Filed: Feb. 28, 2005

(65) Prior Publication Data

US 2005/0193579 A1 Sep. 8, 2005

(30) Foreign Application Priority Data

Mar. 2, 2004 (JP) .......................... P.2004-057355

(51) Int. Cl.
*G01C 19/38* (2006.01)

(52) U.S. Cl. .......................... 33/327; 33/324; 74/5.6 D (58) Field of Classification Search ................. 33/327, 33/324, 316, 317 R, 318, 319; 74/5.6 D, 74/5.8, 5.1, 5.22, 5.41
See application file for complete search history.

(56) References Cited

U.S. PATENT DOCUMENTS

| 1,589,039 | A | * | 6/1926 | Anschutz-Kaempfe | ....... 33/327 |
| 1,924,688 | A | * | 8/1933 | Anschutz-Kaempfe | ....... 33/325 |
| 3,252,340 | A | * | 5/1966 | Watt | .......................... 74/5.46 |
| 3,373,617 | A | * | 3/1968 | Lassig | .......................... 74/5.46 |
| 3,439,546 | A | * | 4/1969 | Bose et al. | ................. 74/5.6 D |
| 4,008,623 | A | * | 2/1977 | Ehrich et al. | .................. 74/5 R |
| 4,441,375 | A | * | 4/1984 | Minohara et al. | ............ 74/5.46 |
| 5,476,018 | A | * | 12/1995 | Nakanishi et al. | ............. 74/5.7 |
| 5,771,596 | A | * | 6/1998 | Bey | .............................. 33/327 |
| 6,261,247 | B1 | * | 7/2001 | Ishikawa et al. | ............. 600/587 |
| 6,324,904 | B1 | * | 12/2001 | Ishikawa et al. | .......... 73/152.03 |
| 6,453,570 | B1 | * | 9/2002 | Rahn | ............................ 33/327 |
| 7,114,263 | B2 | * | 10/2006 | Toda | ............................ 33/327 |
| 2005/0193578 | A1 | * | 9/2005 | Toda | ............................ 33/327 |

OTHER PUBLICATIONS

Torao Mozai et al., (1971) "konpasu to jairo no riron to jissai (Theory and practice of compass gyro)", published by Kaibundou Shuppan Kabushiki Kaisha with concise English explanation.

* cited by examiner

*Primary Examiner*—Diego Gutierrez
*Assistant Examiner*—Amy R. Cohen
(74) *Attorney, Agent, or Firm*—Sughrue Mion, PLLC

(57) ABSTRACT

A gyrocompass has a gyrosphere which incorporates a rotor and floats in a liquid tank filled with an electrolyte, and a plurality of electrodes which are disposed in the gyrosphere and the liquid tank, and are respectively opposed through the electrolyte, wherein at least one circuit which supplies electric power to the rotor involves the electrodes, and the plurality of the electrodes includes a first belt-shaped electrode disposed in an equatorial portion of the gyrosphere, the first belt-shaped electrode is formed of a metal which is corrosion-resistant and is a good conductor, and an insulating film is formed on a portion of a surface of the first belt-shaped electrode.

11 Claims, 6 Drawing Sheets

GYROCOMPASS

CROSS-REFERENCE TO RELATED APPLICATIONS

This application is based upon and claims the benefit of priority from the prior Japanese Patent Applications No. 2004-057355, filed on Mar. 2, 2004, the entire contents of which are incorporated herein by reference.

BACKGROUND OF THE INVENTION

1. Field of the Invention

The present invention relates to an electrode structure of a gyrocompass which includes a gyrosphere incorporating a rotor and floating in a liquid tank filled with an electrolyte, and a plurality of electrodes disposed in the gyrosphere and the liquid tank, respectively opposed through the electrolyte, wherein at least one circuit for supplying electric power to the rotor involves the electrodes.

2. Description of the Related Art

The following publication is known as a document relating to the gyrocompass having a traditional structure.

Figure 5:
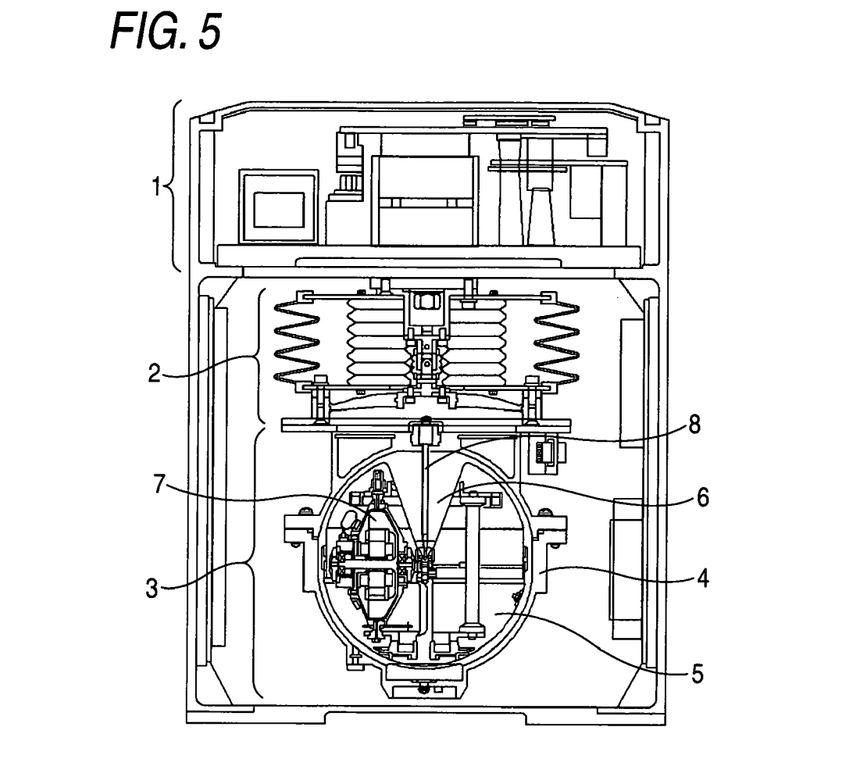
FIG. 5 is a cross-sectional view illustrating a general configuration of a gyrocompass having a center pin.

"konpasu to jairo no riron to jissai (Theory and practice of compass and gyro)" published on Oct. 1, 1971 by Kaibundou Shuppan Kabushiki Kaisha; Authors: Torao MOZAI and Minoru KOBAYASHI FIG. 5 is a cross-sectional view illustrating a general configuration of a gyrocompass having a center pin. Reference numeral 1 denotes a computation and follow-up control unit which is a portion which controls the power supply of the apparatus and various arithmetic operations and is in charge of follow-up control for maintaining the relative angle between a gyrosphere and a liquid tank by detecting the position of the gyrosphere. The computation and follow-up control unit 1 mainly consists of a gear mechanism for follow-up and printed board circuits.

Reference numeral 2 denotes a vibration proofing mechanism for maintaining a liquid tank unit substantially horizontally by inclination like a pendulum and for absorbing the vibrations of a ship in the longitudinal and transverse directions of the ship.

Reference numeral 3 denotes a liquid tank unit which is suspended in the vibration proofing mechanism 2. In the liquid tank unit 3, a liquid tank 4 has a gyrosphere 5 and an electrolyte (supporting liquid) 6 incorporated therein. The gyrosphere 5 has a rotor (gyro rotor) 7 incorporated therein, and floats in the liquid tank 4 by means of the electrolyte 6, and its central portion is rotatably supported by a center pin 8 provided in an upper portion of the liquid tank.

Figure 6:
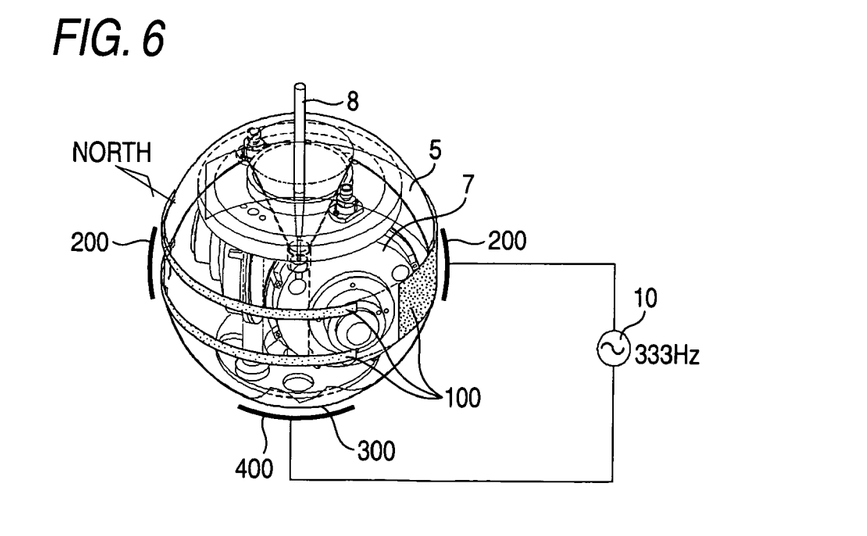
FIG. 6 is a perspective view illustrating a feeding structure for the gyrosphere.

FIG. 6 is a perspective view illustrating a feeding structure for the gyrosphere 5. In the traditional structure, the center pin 8 rotatably supports the gyrosphere 5, energizes the interior of the gyrosphere 5 through mercury disposed at its tip portion, and forms one circuit of a feeding route to the rotor 7.

As a structure which does not use a harmful substance such as mercury in consideration of the environment, a structure has been proposed in which, as shown in FIG. 6, the center pin 8 is made to only support the gyrosphere 5, and, as the feeding route to the rotor 7, a belt-shaped electrode 200 on a liquid tank side, which is disposed in such a manner as to oppose through the electrolyte a belt-shaped electrode 100 provided on an outer periphery of an equatorial portion of the gyrosphere 5, is made to function as one feeding route of an external power supply 10. It should be noted that the other feeding route of the external power supply 10 is the same as in the conventional case, and uses dish-shaped electrodes 300 and 400 disposed in face-to-face relation at the bottoms of the gyrosphere and the liquid tank, respectively.

In the case of this structure, the belt-shaped electrode 100 on a gyrosphere side forms a Wheatstone bridge circuit in cooperation with a pair of follow-up electrodes on the liquid tank side (not shown in FIG. 6), and also serves as an electrode for follow-up control together with the electrode for feeding. By virtue of this structure, there is an advantage in that harmful substances such as insulating oil and mercury provided at the tip portion of the conventional center pin.

Figure 7:
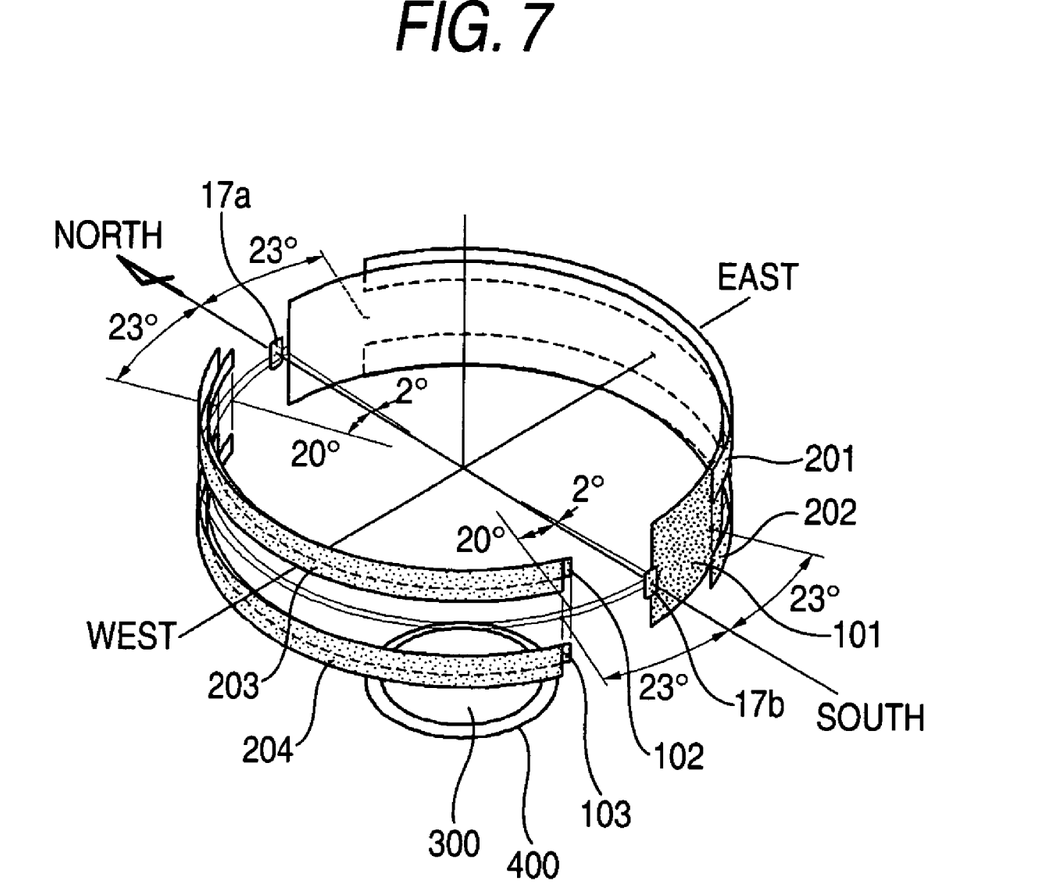
FIG. 7 is a perspective view illustrating as a set the electrodes on the gyrosphere side and the electrodes on the liquid tank side in the gyrocompass based on a design in which feeding is effected from the belt-shaped electrodes in an equatorial portion.

FIG. 7 is a perspective view illustrating as a set the electrodes on the gyrosphere 5 side and the electrodes on the liquid tank 4 side concerning the electrode structure of the gyrocompass based on such a design concept. Numerical values of angles given in the drawing are given by way of example. Since the respective electrodes are given new appellations, they will be described below.

The belt-shaped electrode 100 on the gyrosphere 5 side consists of one central belt-shaped electrode 101 and a pair of two-rowed electrodes 102 and 103. The central belt-shaped electrode 101 is disposed at an equatorial portion on the side surface of the gyrosphere with a predetermined width in the latitudinal direction and with a length extending slightly less than about half around the gyrosphere (its end point being 2° short in terms of the angle in the drawing) between the positions of follow-up electrodes 17a and 17b on the liquid tank side.

The two-rowed electrodes 102 and 103 are formed on an outer peripheral surface opposite to the central belt-shaped electrode 101 in such a manner as to be spaced apart a predetermined distance with the equator located therebetween on the side surface of the gyrosphere and with a length extending slightly less than about half around the gyrosphere (their end points being 20° short in terms of the angle in the drawing).

The belt-shaped electrode 200 on the inner wall surface of the liquid tank consists of a total of four two-rowed electrodes including a pair of two-rowed electrodes 201 and 202 and a pair of two-rowed electrodes 203 and 204. The two-rowed electrodes 201 and 202 are disposed on the inner wall surface of the liquid tank in such a manner as to be arranged in face-to-face relation to the central belt-shaped electrode 101 on the gyrosphere side while keeping a predetermined distance therebetween in the latitudinal direction and with a length extending slightly less than about half around the inner wall of the liquid tank (their end points being 23° short in terms of the angle in the drawing).

The two-rowed electrodes 203 and 204 are formed on the inner wall surface of the liquid tank opposite to the two-rowed electrodes 201 and 202, have a length extending slightly less than about half around the inner wall of the liquid tank (their end points being 23° short in terms of the angle in the drawing), and are arranged in close proximity to and in face-to-face relation to the two-rowed electrodes 102 and 103 on the gyrosphere side through the electrolyte 6.

The dish-shaped electrodes 300 and 400 are formed on the bottom of the liquid tank 4 and the bottom of the gyrosphere 5, and are disposed at positions where they are located in close proximity to and in face-to-face relation to each other through the electrolyte 6.

By virtue of the above-described electrode structure, the mutually opposing belt-shaped electrodes (the central belt-shaped electrode 101 on the gyrosphere and the two-rowed electrodes 201 and 202 on the liquid tank) are capable of assuming large opposing areas in the equatorial portion, and are therefore capable of feeding a sufficient current for driving the rotor 7 if the electrolyte 6 is present in the gap.

In addition, electrolyte resistors Ra and Rb between both ends of the central belt-shaped electrode 101 and the follow-up electrodes 17a and 17b on the liquid tank side are formed into a Wheatstone bridge, follow-up control of the liquid tank with respect to the gyration of the gyrosphere becomes possible as in the conventional case.

Figure 8:
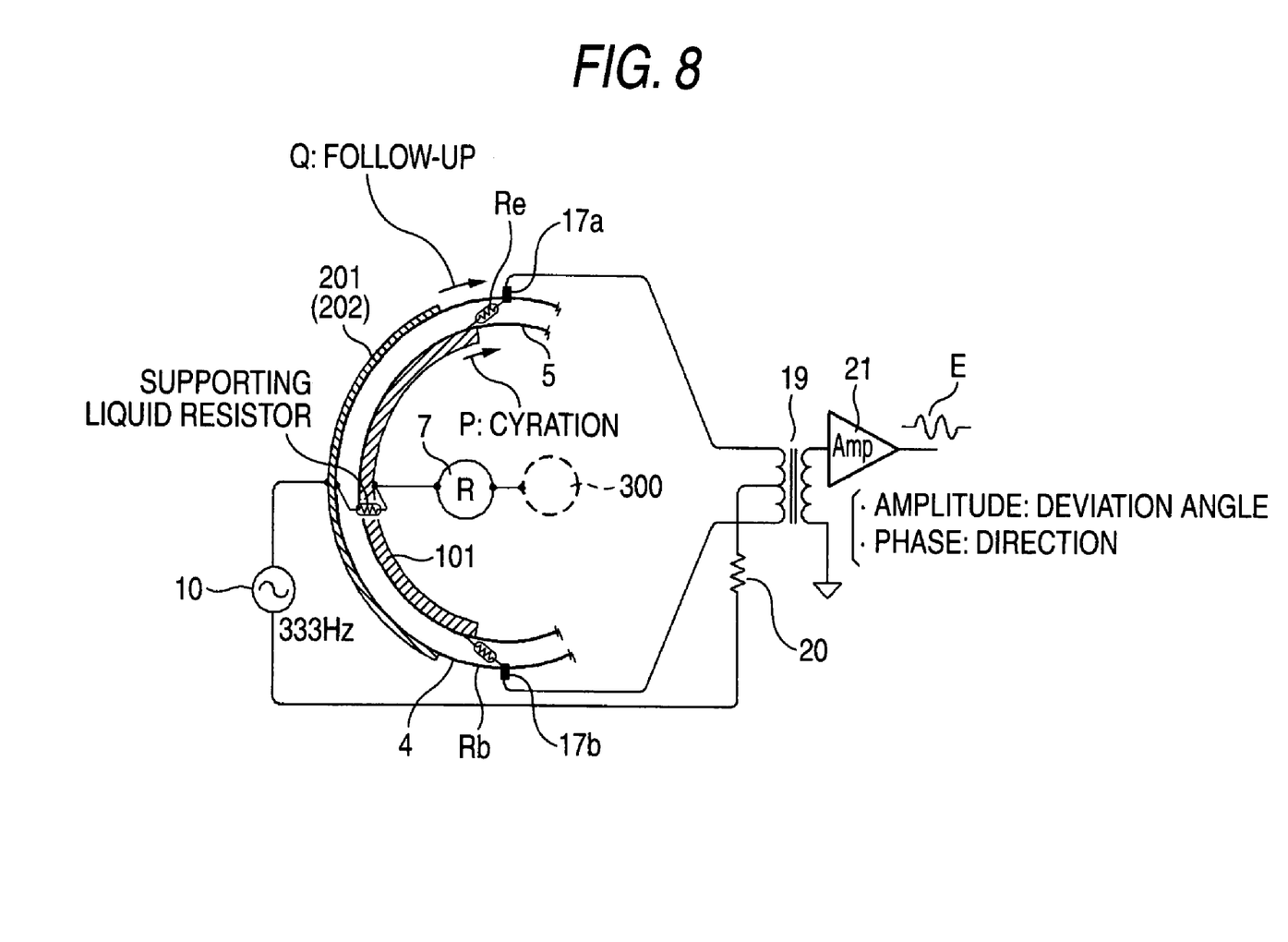
FIG. 8 is a circuit diagram illustrating one example of a deviation detecting mechanism in the follow-up control for causing the liquid tank to follow up the gyration of the gyrosphere.

FIG. 8 is a circuit diagram illustrating one example of a deviation detecting mechanism which is applicable to the electrode structure in FIG. 7 in the follow-up control for causing the liquid tank 4 to follow up the gyration of the gyrosphere 5. The circuit in which the follow-up electrodes 17a and 17b are connected to both ends of a primary winding of a transformer 19 is similar to a conventional bridge circuit (not shown), but differs in that one side of the external power supply 10 is not a dish-shaped electrode as in the conventional circuit but is connected to the two-rowed electrodes 201 and 202 on the liquid tank side.

In FIG. 8, the arrangement of the respective electrodes corresponds to a case in which a cross-sectional view of the liquid tank unit is viewed from above. The two-rowed electrodes 201 and 202 on the liquid tank side and the central belt-shaped electrode 101 on the gyrosphere side are opposed to each other with a relatively large area, and the electrolyte resistance therebetween is either small or of such a magnitude as to be negligible in the operation of the follow-up circuit.

In addition, the two-rowed electrodes 201 and 202 have a smaller spread (angle) than the central belt-shaped electrode 101. The electrolyte resistors Ra and Rb which are present between the ends of the central belt-shaped electrode 101 and the follow-up electrodes 17a and 17b on the liquid tank side function as bridge resistors and form a complete Wheatstone bridge together with the transformer having a center tap in the drawing.

In the above-described configuration, in a case where the gyrosphere 5 has gyrated (rotated) in the direction of arrow P, one follow-up electrode 17a and one end of the central belt-shaped electrode 101 approach each other, while the other follow-up electrode 17b and the other end of the central belt-shaped electrode 101 move away from each other. Therefore, the electrolyte resistors Ra and Rb which are present in the gap mutually change differentially, so that the Wheatstone bridge is set in a state of imbalance.

As for a deviation signal E obtained by amplifying the signal from the Wheatstone bridge induced in a secondary winding of the transformer 19 as a result of this imbalance, its amplitude serves as a deviation angle, and its phase indicates the direction of gyration. It should be noted that the belt-shaped electrodes on the gyrosphere side are provided with different shapes concerning the central belt-shaped electrode 101 and the two-rowed electrodes 102 and 103 is in consideration of ensuring that the follow-up point will not be formed at a 180° inverted point.

The belt-shaped electrodes adopted in the gyrocompass having a traditional structure has the following problems in fabrication:

(1) Problems in the Case of Application to Gyrosphere

In the structure of the belt-shaped electrode which has been in use since before the war, for the convenience of allowing electricity to flow by causing the electrodes to float in the electrolyte whose major agent is benzoic acid, electrodes made of carbon or graphite rubber which is resistant against chemicals have been used.

Since these carbons are not necessarily low in electrical resistance, improvement is made to reduce the electrical resistance by using an electrically conductive adhesive and attaching it onto a core metal which is a spherical shell of the gyrosphere. Meanwhile, an insulating lining is provided on the surface of the gyrosphere other than the electrodes by using ebonite rubber or epoxy resin. However, there has been a problem in that the electrolyte penetrates a boundary between the electrode and the insulating lining over time, so that internal conductors are corroded.

(2) Although the diameter of the gyrosphere which has been used since before the war is 252 mm, the diameter is presently 161 mm in view of demand for a compact size. Light weight is essential in terms of securing buoyancy in the electrolyte, and advancement has been made in the conventionally thick-layered insulating lining toward thin film technology employing such as epoxy powder coating. Meanwhile, carbons and the like are relatively fragile materials, and it is difficult to make them thin in proportion to the fact that the shape of the gyrosphere has become small.

As a result, if the belt-shaped electrodes of the traditional structure are applied to the gyrosphere of a new design, it is impossible to maintain buoyancy, and the electrolyte is more likely to penetrate the boundary between the electrode (carbon or the like) and the thin coating, resulting in a decline in reliability.

(3) Since the number of the belt-shaped electrodes used is as many as three and the manufacturing process is complicated, the product is expensive.

(4) Problems in the Case of Application to the Liquid Tank

Although the belt-shaped electrodes of the traditional structure have been in use since before the war, in the case of the liquid tank as well, for the convenience of allowing electricity to flow across the gyrosphere through the electrolyte whose major agent is benzoic acid, electrodes made of carbon or graphite rubber which is resistant against chemicals have been used. Since these carbons are not necessarily low in electrical resistance, improvement is made to reduce the electrical resistance by using an electrically conductive adhesive and attaching it onto the inner surface of the liquid tank made of an aluminum casting in the same way as the gyrosphere.

However, in the light of demand or a compact size and low cost, the present day liquid tank is generally molded from plastics. If the liquid tank is made of plastics, the conventional process for manufacturing the belt-shaped electrode cannot be used at all.

(5) Since the number of the belt-shaped electrodes used is as many as four and the manufacturing process is complicated, the product is expensive and has low reliability.

SUMMARY OF THE INVENTION

The object of the invention is to provide a high-accuracy gyrocompass having a general-purpose electrode structure capable of feeding from the belt-shaped electrodes in the equatorial portion.

The invention provides a gyrocompass having: a gyrosphere which incorporates a rotor and floats in a liquid tank filled with an electrolyte; and a plurality of electrodes which are disposed in the gyrosphere and the liquid tank, and are respectively opposed through the electrolyte, wherein at least one circuit which supplies electric power to the rotor involves the electrodes, and the plurality of the electrodes includes a first belt-shaped electrode disposed in an equatorial portion of the gyrosphere, the first belt-shaped electrode is formed of a metal which is corrosion-resistant and is a good conductor, and an insulating film is formed on a portion of a surface of the first belt-shaped electrode.

Furthermore, the plurality of electrodes includes a second belt-shaped electrode disposed in a portion of the liquid tank where are faced to the equatorial portion of the gyrosphere, and the second belt-shaped electrode is formed of a metal which is corrosion-resistant and is a good conductor.

Furthermore, the plurality of electrodes includes dish-shaped electrodes which are disposed in a vicinity of a bottom of the gyrosphere, and are respectively opposed, and at least one of the dish-shaped electrodes is formed of a metal which is corrosion-resistant and is a good conductor.

Furthermore, the metal is a titanium.

Furthermore, each of the plurality of electrodes is plated to be corrosion-resistant on a surface thereof.

According to the gyrocompass, Feeding from the belt-shaped electrodes in the equatorial portion is possible, and it is possible to easily realize a newly designed gyrocompass.

Further, the invention has versatility allowing application to a gyrocompass in which the liquid tank is formed of plastics, and can also be used for a gyrocompass having a traditional feeding route, and contributions can be made in the compact size and reduced cost.

DETAILED DESCRIPTION OF THE PREFERRED EMBODIMENTS

Figure 1:
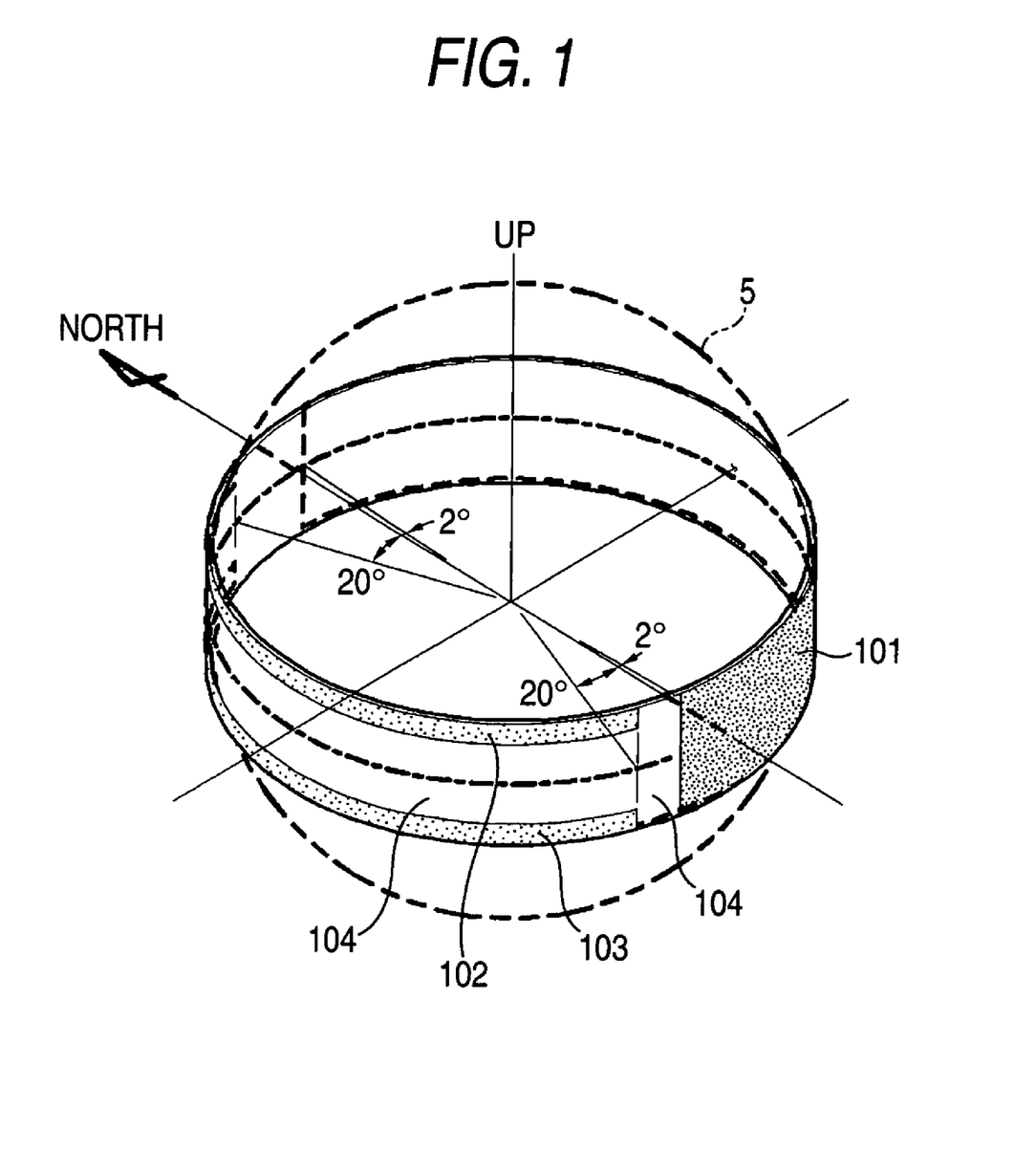
FIG. 1 is a perspective view illustrating an embodiment of a belt-shaped electrode on a gyrosphere side to which the invention is applied.
Figure 2:
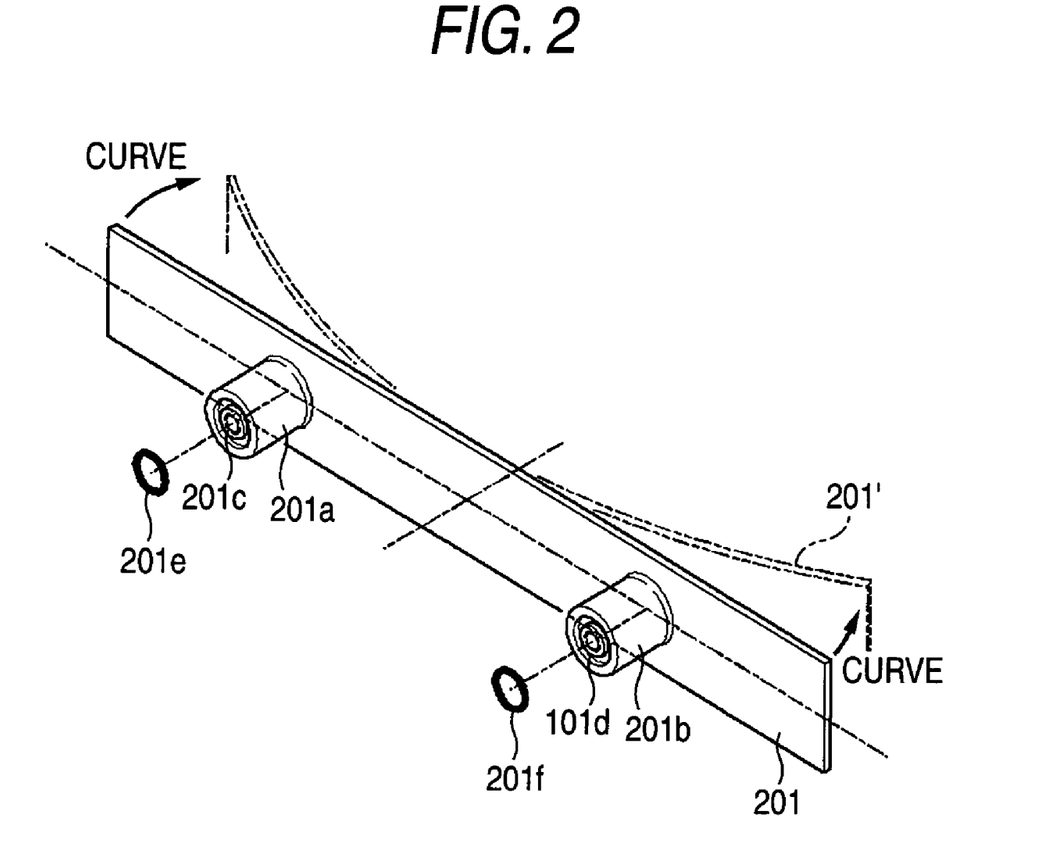
FIG. 2 is a perspective view illustrating an embodiment of a belt-shaped electrode on a liquid tank side to which the invention is applied.
Figure 3:
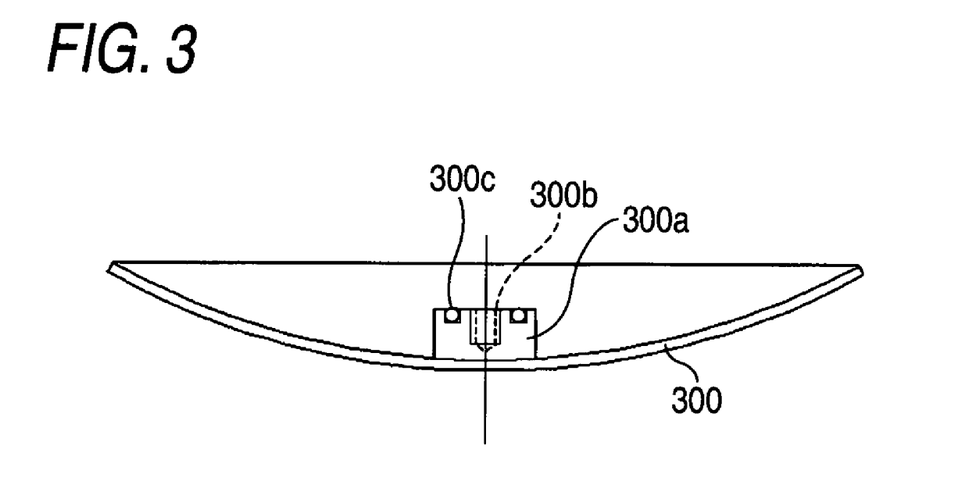
FIG. 3 is a perspective view illustrating an embodiment of a dish-shaped electrode on the gyrosphere side to which the invention is applied.
Figure 4:
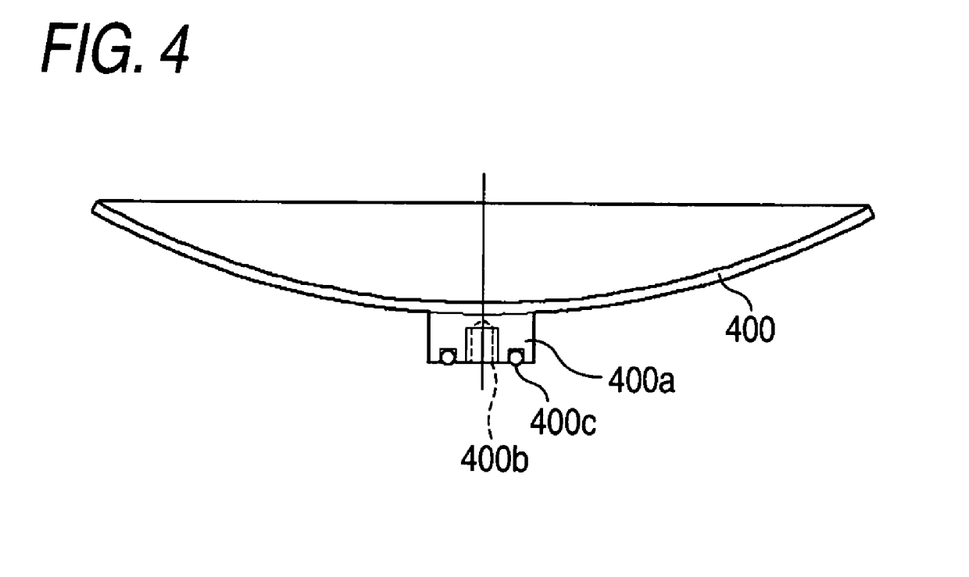
FIG. 4 is a perspective view illustrating an embodiment of a dish-shaped electrode on the liquid tank side to which the invention is applied.

Embodiments of the invention are described with reference to the drawings. FIG. 1 is a perspective view illustrating an embodiment of a belt-shaped electrode on a gyrosphere side to which the invention is applied. FIG. 2 is a perspective view illustrating an embodiment of a belt-shaped electrode on a liquid tank side to which the invention is applied. FIG. 3 is a perspective view illustrating an embodiment of a dish-shaped electrode on the gyrosphere side to which the invention is applied. FIG. 4 is a perspective view illustrating an embodiment of a dish-shaped electrode on liquid tank side to which the invention is applied.

Referring to FIG. 1, a description will be given of an embodiment of a belt-shaped electrode on the gyrosphere side to which the invention is applied. The illustrated structure is such that ends of a belt-shaped plate made of a corrosion-resistant metal (e.g., titanium) are abutted against each other annularly, and the belt-shaped plate is welded to an equatorial portion of a gyrosphere 5. An insulating film 104 is formed on a portion excluding a central belt-shaped electrode 101 and two-rowed electrodes 102 and 103 by the coating of an epoxy powder coating or the like.

According to the above-described structure, the electrodes of complex shapes can be fabricated in a simple process at low cost. Although titanium, for example, has a specific gravity of about twice that of carbon, since its thickness can be made overwhelmingly thin, it becomes light. Even though it is thin, titanium is a good conductor, so that it allows a large amount of electric current to flow, and it is readily possible to maintain various portions at the same potential.

In a case where these electrodes are fitted to the gyrosphere 5, it suffices if they are partially fused onto the core metal (e.g., aluminum) of the gyrosphere, and an insulating coating is then provided collectively by such as epoxy powder coating. In general, soldering or the like of titanium and silver is easy, and the fusion with aluminum may in some cases require interposition of a metal such as silver, or an electric current may be introduced into the gyrosphere by using silver wires, so that the fusion with aluminum is not a major hindrance.

An electrolyte 6 is difficult to penetrate the boundary between the insulating film 104 and the electrode surface of each of the exposed electrodes 101, 102, and 103, and even if it penetrates it, since the metal is corrosion-resistant, there occurs no problem.

Next, referring to FIG. 2, an embodiment of a belt-shaped electrode on the liquid tank side to which the invention is applied will be described by using a two-rowed electrode 201 as a typical electrode. The illustrated structure is an example in which bosses 201a and 201b are provided uprightly on the liquid tank-side surface at both ends of the belt-shaped plate 201 made of a corrosion-resistant metal (e.g., titanium), and the respective bosses are provided with threaded holes 201c and 201d and O-rings 201e and 201f for mounting.

After so doing, if recessed portions for fitting the projecting portions of the bosses are formed in an inner surface of a liquid tank 4, and the electrode 201 is mounted in such a manner as to usher it from the outside by using screws through the threaded holes penetrating these recessed portions, the electrode 201 which is a thin plate is curbed, as shown at 201', in conformity with the curved surface of the inner wall of the liquid tank 4.

The feeding to this electrode can be easily effected by using as terminals the screws which ushered. In addition, since the water-tightness of the liquid tank can be ensured simply by means of O-rings or the like, fabrication can be effected very easily, and high reliability can be ensured.

Next, referring to FIG. 3, a description will be given of an embodiment of a dish-shaped electrode 300 on the gyrosphere side to which the invention is applied. The structure is an example in which a thin plate 300 of a corrosion-resistant metal (e.g., titanium) is drawn into the form of a dish, a boss 300a is provided uprightly on the inner side of the gyrosphere, and this boss is provided with a threaded hole 300b and an O-ring 300c for mounting.

In a present-day traditional gyrocompass, carbon is used for the dish-shaped electrode. In a case where a feeding system in which feeding is effected via the belt-shaped electrodes in the equatorial portion is adopted as a newly designed gyrocompass, insofar as "the total of electrolyte resistance between the belt-shaped electrode portion and the dish-shaped electrode portion" is made equal to or less than the existing "electrolyte resistance of the dish-shaped electrode portion" in consequence, the rotor (gyro rotor) inside the gyrosphere cannot be rotated satisfactorily. Accordingly, it is necessary to increase the area of the dish-shaped electrode more than in the conventional case. However, if carbon is used, it leads to an increase in the weight of the gyrosphere, so that carbon cannot be used.

Since the dish-shaped electrode of the gyrocompass of the invention can be designed to be lightweight while securing a sufficient opposing area, it becomes possible to simultaneously realize the supply of a sufficient drive current and the making of a lightweight gyrosphere even in the case where the feeding system is adopted in which feeding is effected via the belt-shaped electrodes in the equatorial portion.

Next, referring to FIG. 4, a description will be given of an embodiment of a dish-shaped electrode 400 on the liquid tank side to which the invention is applied. The structure is an example in which a thin plate 400 of a corrosion-resistant metal (e.g., titanium) is drawn into the form of a dish, and a boss 400a is provided uprightly on the inner wall side of the liquid tank, and this boss is provided with a threaded hole 400b and an O-ring 400c for mounting.

If a corrosion-resistant metal is used for the dish-shaped electrode 300 on the gyrosphere side as in the embodiment shown in FIG. 3, an electric current should not be allowed to flow across materials of different ionization tendencies in the electrolyte, so that a similar material should be used as the dish-shaped electrode 400 on the liquid tank side as well. In addition, if the dish-shaped electrode 300 on the gyrosphere side is made large (wide), the dish-shaped electrode 400 on the liquid tank side opposing it should also be made large (wide), in which case a metal which is corrosion-resistant and is a good conductor excels over carbon as the electrode.

Furthermore, the dish-shaped electrodes 300 and 400 are respectively joined in close contact with the gyrosphere 5 and the liquid tank 4 through an insulating material, water-tightness with respect to the electrolyte can easily be provided by the O-rings, while connection to the interior of the gyrosphere and to the outer side of the liquid tank can easily be effected through the threaded holes.

Although in the above-described embodiments, as the metal which is corrosion-resistant and is a good conductor, a metal has been illustrated which has resistance in itself, such as titanium, the invention can also be realized by a metal or the like in which a gold or platinum plating is provided on the surface of a nickel or stainless alloy.

Although in the above-described embodiments a description has been given of the example in which the invention is applied to a newly designed gyrocompass in which electricity is fed to the rotor via the belt-shaped electrodes in the equatorial portion and the dish-shaped electrodes at the bottoms, the electrode structure of the gyrocompass of the invention has versatility, and may also be applied to the gyrocompass of the traditional structure. Namely, it becomes possible to make contributions to the light weight and reduced cost of the gyrocompass irrespective of the feeding route to the rotor.

What is claimed is:

1. A gyrocompass comprising: a gyrosphere which incorporates a rotor and floats in a liquid tank filled with an electrolyte; and a plurality of electrodes which are disposed on the gyrosphere and the liquid tank, and are respectively opposed through the electrolyte, wherein at least one circuit which supplies electric power to the rotor involves the electrodes, and the plurality of the electrodes includes a first belt-shaped electrode disposed in an equatorial portion of the gyrosphere, the first belt-shaped electrode is formed of a metal which is corrosion-resistant and is a good conductor, and an insulating film is formed on a portion of a surface of the first belt-shaped electrode.

2. The gyrocompass according to claim 1, wherein the plurality of electrodes includes a second belt-shaped electrode disposed in a portion of the liquid tank that faces the equatorial portion of the gyrosphere, and the second belt-shaped electrode is formed of a metal which is corrosion-resistant and is a good conductor.

3. The gyrocompass according to claim 1, wherein the plurality of electrodes includes dish-shaped electrodes which are disposed in a vicinity of a bottom of the gyrosphere, and are respectively opposed, and at least one of the dish-shaped electrodes is formed of a metal which is corrosion-resistant and is a good conductor.

4. The gyrocompass according to claim 1, wherein the metal is a titanium.

5. The gyrocompass according to claim 1, wherein each of the plurality of electrodes is plated to be corrosion-resistant on a surface thereof.

6. A gyrocompass comprising:
a liquid tank;
a gyrosphere made from a first material which is sized to incorporate a rotor and to floats in the liquid tank when filled with an electrolyte; and
a plurality of electrodes which are disposed on the gyrosphere and the liquid tank and are respectively opposed through the electrolyte, wherein
said electrodes are adapted to supply electric power to the rotor,
the plurality of the electrodes includes a first belt-shaped electrode made of a second material and formed on said first material and being disposed in an equatorial portion of the gyrosphere, said second material being a metal which is corrosion-resistant and is a good conductor and a second belt-shaped electrode disposed on an inner wall of said liquid tank, and
an insulating film formed on a portion of a surface of the first belt-shaped electrode.

7. The gyrocompass according to claim 6, wherein the first belt-shaped electrode comprises a central belt-shaped electrode and at least one multi-rowed electrode, said first belt-shaped electrode being disposed at an equatorial portion on a side surface of the gyrosphere with a predetermined width in a latitude direction and with a length extending slightly less than about half around the gyrosphere.

8. The gyrocompass according to claim 7, further comprising a second multi-rowed electrode formed on an outer peripheral surface opposite to the first belt-shaped electrode in such a manner as to be spaced apart a predetermined distance, with an equator located there between on the side surface of the gyrosphere, said second multi-rowed electrodes having a length extending slightly less than about half around the gyrosphere.

9. The gyrocompass according to claim 6, wherein the second belt-shaped electrode comprises a plurality of multi-rowed electrodes including a first pair of multi-rowed electrodes and a second pair of multi-rowed electrodes.

10. The gyrocompass according to claim 9, wherein at least one pair of multi-rowed electrodes is disposed on the inner wall surface of the liquid tank in such a manner as to be arranged in a face-to-face relation to at least a portion of the first belt-shaped electrode on the gyrosphere side, while keeping a predetermined distance there between in the latitudinal direction.

11. The gyrocompass according to claim 10, wherein the length of the electrodes extends slightly less than about half around the inner wall of the liquid tank.

* * * * *